(12) United States Patent
Kowarz (10) Patent No.: US 6,307,663 B1
(45) Date of Patent: Oct. 23, 2001

(54) SPATIAL LIGHT MODULATOR WITH CONFORMAL GRATING DEVICE

(75) Inventor: Marek W. Kowarz, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/491,354

(22) Filed: Jan. 26, 2000

(51) Int. Cl.[7] ............................. G02B 26/00; G02B 5/18
(52) U.S. Cl. ..................... 359/231; 359/291; 359/295; 359/572; 359/573; 359/900
(58) Field of Search ........................ 359/572, 573, 359/291, 292, 295, 290, 223, 224, 225, 900

(56) References Cited

U.S. PATENT DOCUMENTS

| | | |
|---|---|---|
| 4,441,791 | 4/1984 | Hornbeck . |
| 4,626,920 | 12/1986 | Glenn . |
| 4,857,978 | 8/1989 | Goldburt et al. . |
| 5,170,283 | 12/1992 | O'Brien et al. ...................... 359/291 |
| 5,311,360 | 5/1994 | Bloom et al. ...................... 359/572 |
| 5,459,610 | 10/1995 | Bloom et al. ...................... 359/572 |
| 5,661,592 | 8/1997 | Bornstein et al. .................... 359/291 |
| 5,677,783 | 10/1997 | Bloom et al. ....................... 359/224 |
| 5,841,579 | 11/1998 | Bloom et al. ....................... 359/572 |
| 5,844,711 | 12/1998 | Long, Jr. ............................. 359/291 |
| 5,867,302 | * 2/1999 | Fleming .............................. 359/291 |
| 5,982,553 | 11/1999 | Bloom et al. ...................... 359/627 |
| 6,215,579 | * 4/2001 | Bloom et al. ....................... 359/572 |

OTHER PUBLICATIONS

H. Roder et al., "Full–colour diffraction–based optical system for light–valve projection displays", *Displays 16*, 1995, pp. 27–34.

W. Brinker et al., "Metallized viscoelastic control layers for light–value projection displays," *Displays 16*, 1995, pp. 13–20.

\* cited by examiner

*Primary Examiner*—Cassandra Spyrou
*Assistant Examiner*—John Juba, Jr.
(74) *Attorney, Agent, or Firm*—Thomas H. Close; Stephen H. Shaw (57) ABSTRACT

A mechanical grating device for modulating an incident beam of light by diffraction includes an elongated element including a light reflective surface; a pair of end supports for supporting the elongated element at both ends over a substrate; at least one intermediate support between the end supports; and means for applying a force to the elongated element to cause the element to deform between first and second operating states

30 Claims, 8 Drawing Sheets

SPATIAL LIGHT MODULATOR WITH CONFORMAL GRATING DEVICE

FIELD OF THE INVENTION

This invention relates to a micromechanical device for spatially and temporally modulating an incident beam of light and, more particularly, to an electromechanical device with a conformal grating structure that causes diffraction of the incident light beam.

BACKGROUND OF THE INVENTION

Electromechanical spatial light modulators with a variety of designs have been used in applications such as display, optical processing, printing, optical data storage and spectroscopy. These modulators produce spatial variations in the phase and/or amplitude of an incident beam of light using arrays of individually addressable devices.

Spatial phase modulation of an incident beam can be accomplished by arrays of individually addressable deformable mirrors. Such devices can be from a deformable reflective membrane suspended over a grid of supports, as described in U.S. Pat. No. 4,441,791, issued Apr. 10, 1984 to Hornbeck, entitled "Deformable Mirror Light Modulator." However, because of the membrane and support structure, these particular deformable mirrors are very inefficient. More efficient deformable mirror designs are disclosed in U.S Pat. No. 5,170,283, issued Dec. 8, 1992 to O'Brien et al., entitled "Silicon Spatial Light Modulator," and in U.S. Pat. No. 5,844,711, issued Dec. 1, 1998 to Long, Jr., entitled "Tunable Spatial Light Modulator."

Another class of electromechanical spatial light modulators has devices with a periodic sequence of reflective elements that form electromechanical phase gratings. In such devices, the incident light beam is selectively reflected or diffracted into a number of discrete orders. Depending on the application, one or more of these diffracted orders may be collected and used by the optical system. For many applications, electromechanical phase gratings are preferable to deformable mirrors. Electromechanical phase gratings can be formed in metallized elastomer gels; see U.S. Pat. No. 4,626,920, issued Dec. 2, 1986 to Glenn, entitled "Solid State Light Modulator Structure," and U.S. Pat. No. 4,857,978, issued Aug. 15, 1989 to Goldburt et al., entitled "Solid State Light Modulator Incorporating Metallized Gel and Method of Metallization." The electrodes below the elastomer are patterned so that the application of a voltage deforms the elastomer producing a nearly sinusoidal phase grating. These types of devices have been successfully used in color projection displays; see "Metallized viscoelastic control layers for light-valve projection displays," Displays 16, 1995, pages 13–20, and "Full-colour diffraction-based optical system for light-valve projection displays," Displays 16, 1995, pages 27–34.

An electromechanical phase grating with a much faster response time can be made of suspended micromechanical ribbon elements, as described in U.S. Pat. No. 5,311,360, issued May 10, 1994, to Bloom et al., entitled "Method and Apparatus for Modulating a Light Beam." This device, also known as a grating light valve (GLV), can be fabricated with CMOS-like processes on silicon. Improvements in the device were later described by Bloom et al. that included: 1) patterned raised areas beneath the ribbons to minimize contact area to obviate stiction between the ribbons and the substrate, and 2) an alternative device design in which the spacing between ribbons was decreased and alternate ribbons were actuated to produce good contrast. See U.S. Pat. No. 5,459,610, issued Oct. 17, 1995 to Bloom et al., entitled "Deformable Grating Apparatus for Modulating a Light Beam and Including Means for Obviating Stiction Between Grating Elements and Underlying Substrate." Bloom et al. also presented a method for fabricating the device; see U.S. Pat. No. 5,677,783, issued Oct. 14, 1997, entitled "Method of Making a Deformable Grating Apparatus for Modulating a Light Beam and Including Means for Obviating Stiction Between Grating Elements and Underlying Substrate." Additional improvements in the design and fabrication of the GLV were described in U.S. Pat. No. 5,841,579, issued Nov. 24, 1998 to Bloom et al., entitled "Flat Diffraction Grating Light Valve," and in U.S. Pat. No. 5,661,592, issued Aug. 26, 1997 to Bornstein et al., entitled "Method of Making and an Apparatus for a Flat Diffraction Grating Light Valve." Linear arrays of GLV devices can be used for display and printing as described in U.S. Pat. No. 5,982,553, issued Nov. 9, 1999 to Bloom et al., entitled "Display Device Incorporating One-Dimensional Grating Light-Valve Array." With linear GLV arrays of this type, the diffraction direction is not perpendicular to the array direction, which increases the complexity of the optical system required for separation of the diffracted orders. Furthermore, the active region of the array is relatively narrow requiring good alignment of line illumination over the entire length of the array, typically to within 10–30 microns over a few centimeters of length. The line illumination then also needs to be very straight over the entire linear array.

There is a need therefore for a linear array of grating devices that has a large active region with the diffraction direction perpendicular to the array direction. Furthermore, the device must be able to diffract light efficiently at high speed into discrete orders and the device fabrication must be compatible with CMOS-like processes.

SUMMARY OF THE INVENTION

The need is met according to the present invention by providing a mechanical grating device for modulating an incident beam of light by diffraction, that includes an elongated element including a light reflective surface; a pair of end supports for supporting the elongated element at both ends over a substrate; at least one intermediate support between the end supports; and means for applying a force to the elongated element to cause the element to deform between first and second operating states.

The present invention has the advantage of having a wide active region compared to prior art grating light valve arrays, thereby facilitating alignment of the device and allowing tolerances on the illumination system to be relaxed. The device has the further advantage that the diffraction direction is perpendicular to the long axis of the array, thereby allowing simplification of the optics employed to collect the light diffracted by the array.

BRIEF DESCRIPTION OF THE DRAWINGS

FIGS. 4a and b are a cross-sectional views through line 4—4 in FIG. 1 showing the device in an unactuated state and an actuated state, respectively;

DETAILED DESCRIPTION OF THE INVENTION

Figure 1:
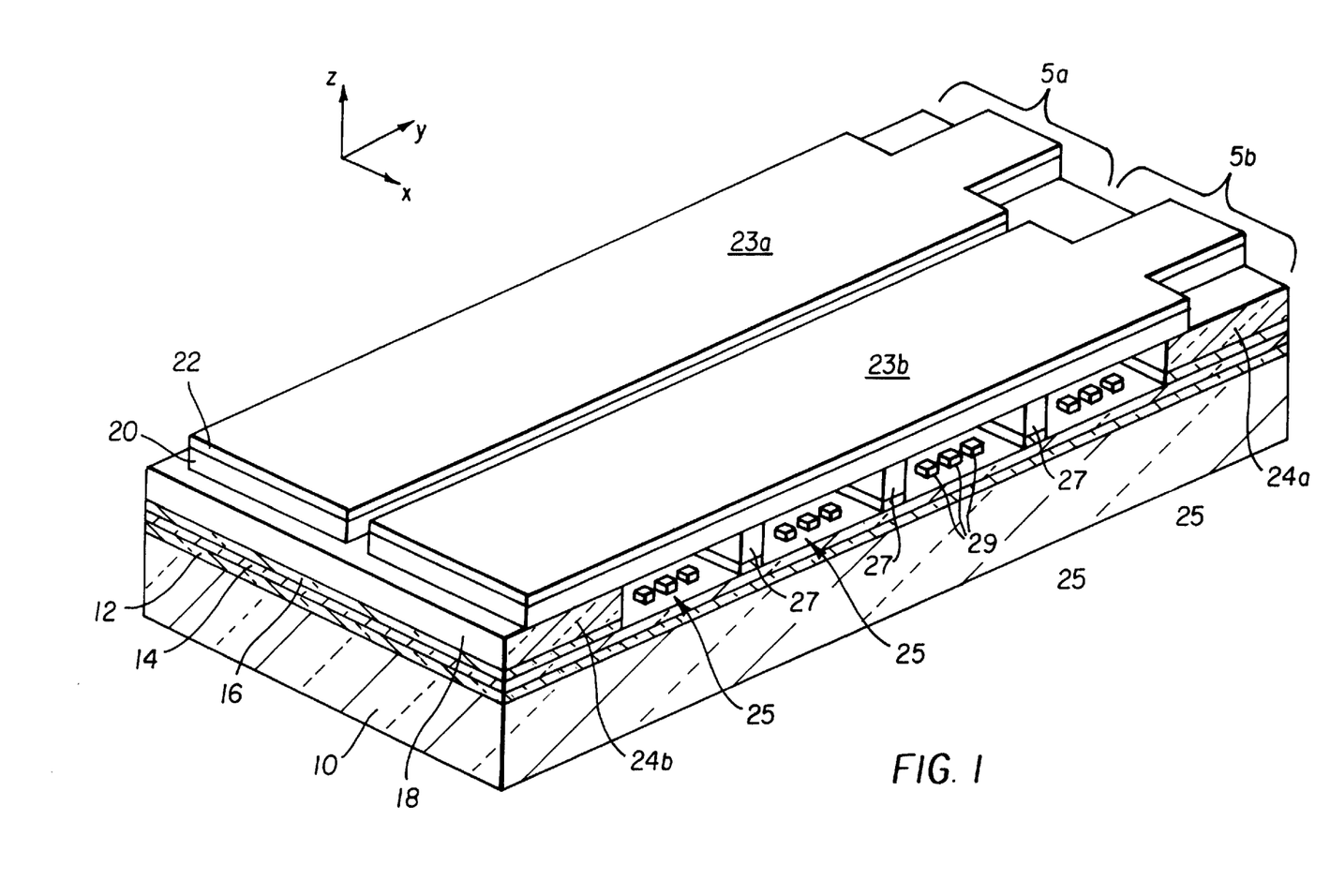
FIG. 1 is a perspective, partially cut-away view of the spatial light modulator with conformal grating devices of the present invention, showing two devices in a linear arrays.

The conformal grating devices of the preferred embodiment of the present invention are illustrated in FIGS. 1–4. FIG. 1 shows the structure of two side-by-side conformal grating devices 5a and 5b in an unactuated state. In this embodiment, the devices can be operated by the application of an electrostatic force. The grating devices 5a and 5b are formed on top of a substrate 10, made of glass, metal, plastic or semiconductor materials, that is covered by a bottom conductive layer 12 which acts as an electrode to actuate the devices. The bottom conductive layer 12 can be made of materials such as aluminum, titanium, gold, silver, tungsten, doped silicon or indium tin oxide. The bottom conductive layer 12 is covered by a dielectric protective layer 14 followed by a spacer layer 18. On top of the spacer layer 18, a ribbon layer 20 is formed which is covered by a reflective layer 22. In the present embodiment, the reflective layer 22 is also a conductor in order to provide electrodes for the actuation of the conformal grating devices 5a and 5b. The reflective and conductive layer 22 is patterned to provide electrodes to the two conformal grating devices 5a and 5b. The ribbon layer 20 preferably comprises a material with a sufficient tensile stress to provide a large restoring force. Examples of ribbon materials are silicon nitride, titanium aluminide, and titanium oxide. The thickness and tensile stress of the ribbon layer 20 are chosen to optimize performance by influencing the electrostatic force for actuation and the restoring force. These forces affect the voltage requirement, speed and resonance frequency of the conformal grating devices 5a and 5b.

Each of the two devices 5a and 5b has an associated elongated ribbon element 23a and 23b, respectively, patterned from the reflective and conductive layer 22 and the ribbon layer 20. The elongated ribbon elements 23a and 23b are supported by end supports 24a and 24b formed from the spacer layer 18 and by one or more intermediate supports 27. In FIG. 1, three intermediate supports 27 are shown formed from the spacer layer 18. These intermediate supports 27 are uniformly separated in order to form four equal-width channels 25. The elongated ribbon elements 23a and 23b are secured to the end supports and to the intermediate supports 27. The end supports 24a and b are not defined other than at their edges facing the channel 25. A plurality of square standoffs 29 is patterned at the bottom of the channels 25 from the standoff layer 14. These standoffs 29 reduce the possibility of the ribbon elements sticking when actuated. The standoffs may also be patterned in shapes other than square; for example, rectangular or round.

Figure 2:
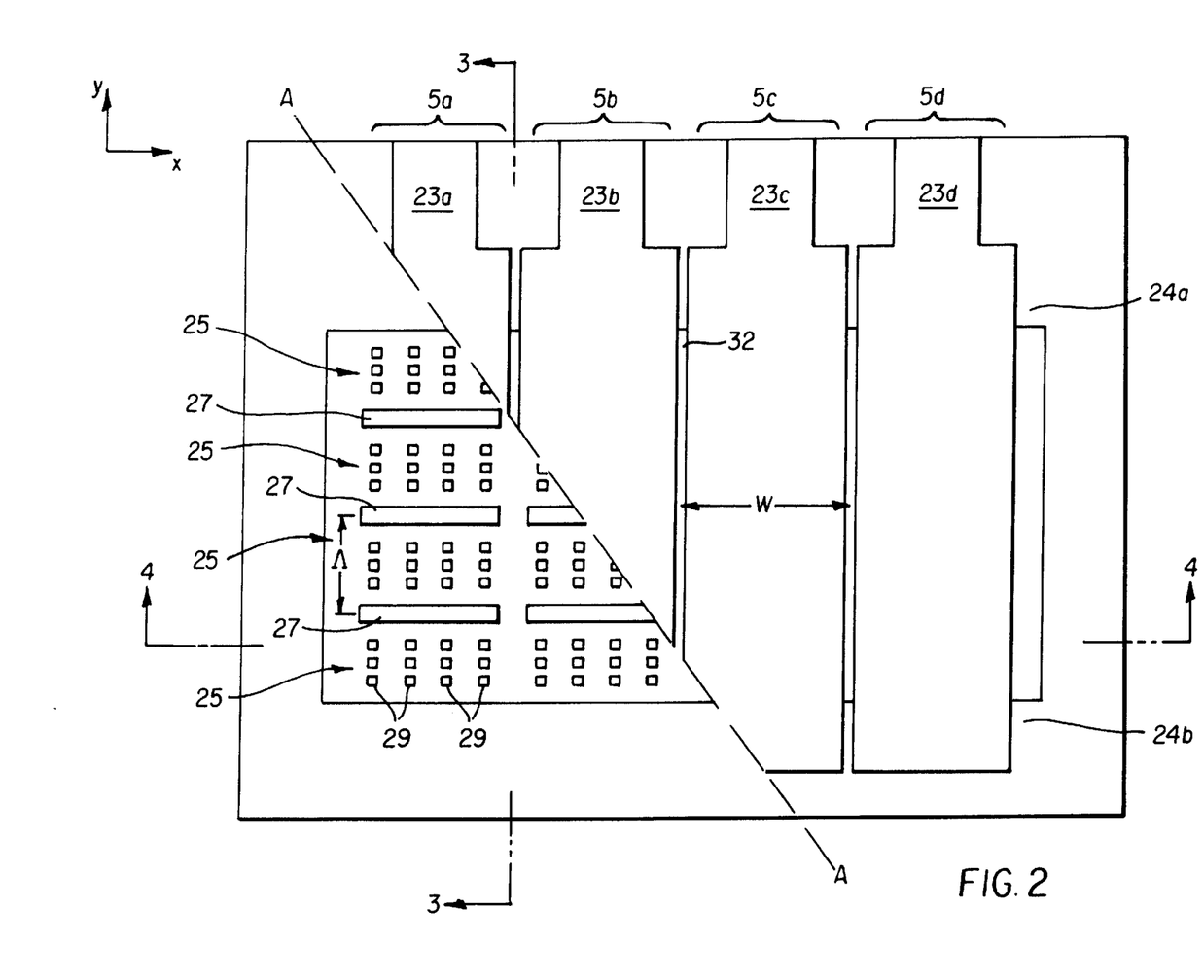
FIG. 2 is a top view of the spatial light modulator of the present invention, showing four devices in a linear array.

A top view of a four-device linear array of conformal grating devices 5a, 5b, 5c and 5d is shown in FIG. 2. The elongated ribbon elements are depicted partially removed over the portion of the diagram below the line 2—2 in order to show the underlying structure. For best optical performance and maximum contrast, the intermediate supports 27 must be completely hidden below the elongated ribbon elements 23a, 23b, 23c and 23d. Therefore, when viewed from the top, the intermediate supports must not be visible in the gaps 32 between the conformal grating devices 5a–5d. Here each of the conformal grating devices has three intermediate supports 27 with four equal-width channels 25.

The center-to-center separation $\Lambda$ of the intermediate supports 27 defines the period of the conformal grating devices in the actuated state. The elongated ribbon elements 23a–23d are mechanically and electrically isolated from one another, allowing independent operation of the four conformal grating devices 5a–5d. The bottom conductive layer 12 of FIG. 1 can be common to all of the devices.

Figure 3A:
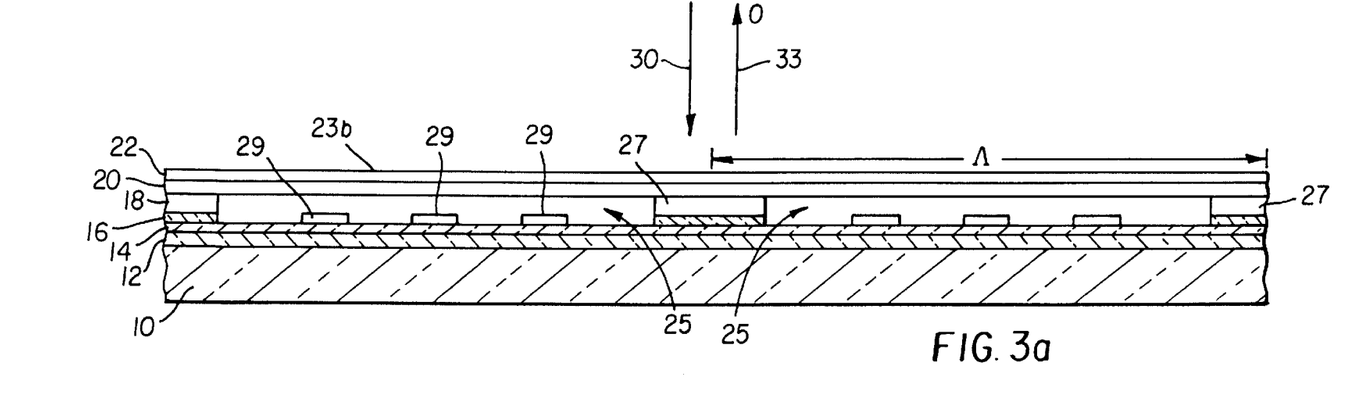
FIGS. 3a and 3b, are cross-sectional views through line 3—3 in FIG. 2 showing the device in an unactuated state and an actuated state, respectively.
Figure 3B:
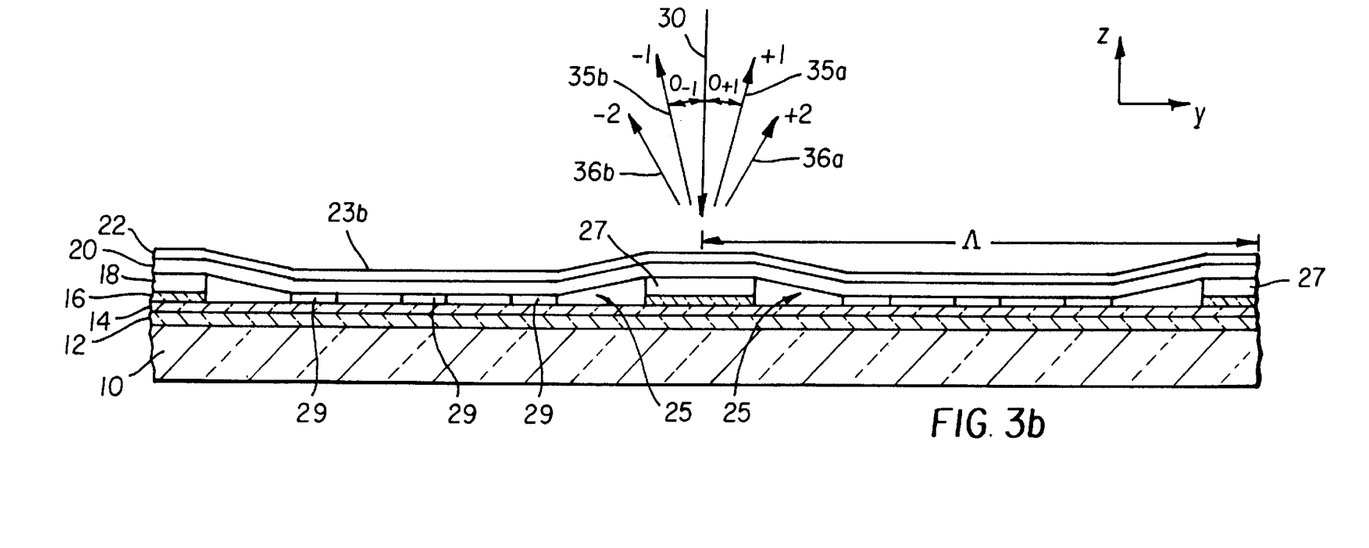

FIG. 3a is a side view, through line 3—of FIG. 2, of two channels 25 of the conformal grating device 5b in the unactuated state. FIG. 3b shows the same view of the actuated state. For operation of the device, an attractive electrostatic force is produced by applying a voltage difference between the bottom conductive layer 12 and the conducting layer 22 of the elongated ribbon element 23b. In the unactuated state (see FIG. 3a), with no voltage difference, the ribbon element 23b is suspended flat between the supports. In this state, an incident light beam 30 is primarily reflected 33 into the mirror direction. To obtain the actuated state, a voltage is applied to the conformal grating device 5b, which deforms the elongated ribbon element 23b and produces a partially conformal grating with period A. FIGS. 3b shows the device in the fully actuated state with the elongated ribbon element 23b in contact with the standoffs 29. The height difference between the bottom of element 23b and the top of the standoffs 29 is chosen to be approximately ¼ of the wavelength $\lambda$ of the incident light. The optimum height depends on the specific shape of the actuated device. In the actuated state, the incident light beam 30 is primarily diffracted into the $+1^{st}$ order 35a and $-1^{st}$ order 35b, with additional light diffiacted into the $+2^{nd}$ order 36a and $-2_{nd}$ order 36b. A small amount of light is diffracted into even higher orders and some is reflected. For light incident perpendicular to the surface of the device, the angle $\theta_m$ between the incident beam and the mth order diffracted beam is given by $$\sin \theta_m = m\lambda/\Lambda,$$

where m is an integer.

One or more of the diffiacted orders can be collected and used by the optical system, depending on the application. When the applied voltage is removed, the forces due to the tensile stress and bending restores the ribbon element 23b to its original unactuated state.

Figure 4A:
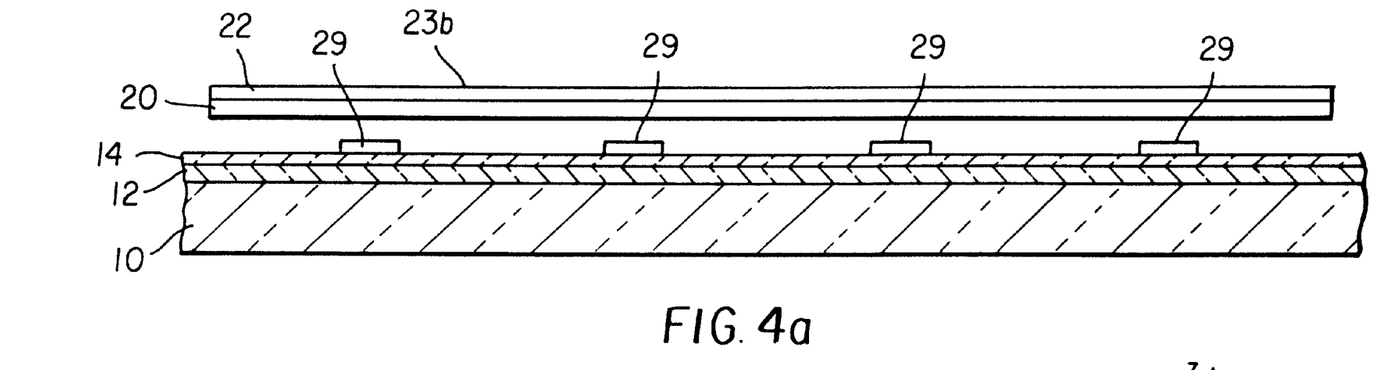
FIGS. 4a and 4b are cross-sectional views through line 4—4 in FIG. 2 showing the device in an unactuated state and an actuated state, respectively.
Figure 4B:
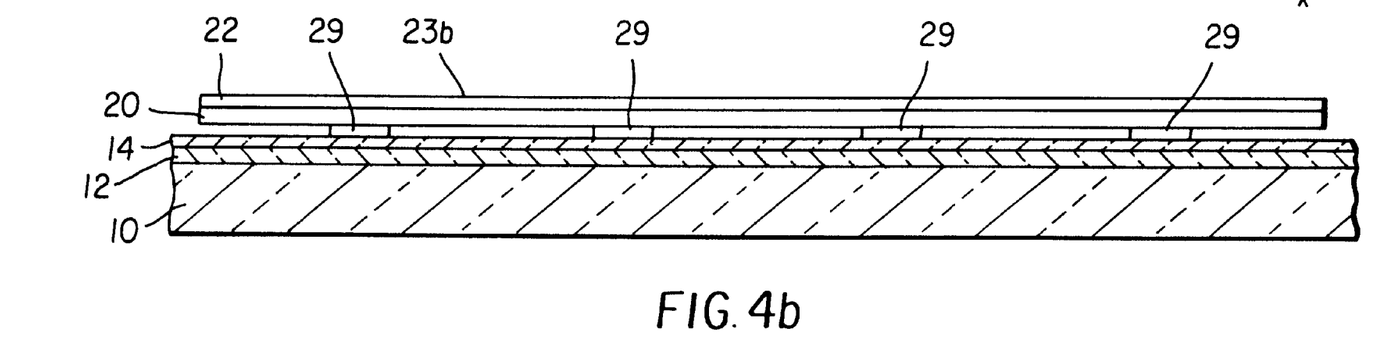

FIGS. 4a and 4b show a rotated side view through line 4—4 of FIG. 2 of the conformal grating device 5b in the unactuated and actuated states, respectively. The elongated ribbon element 23b is suspended by the end support 24b and the adjacent intermediate support 27 (not shown in this perspective). The application of a voltage actuates the device as illustrated in FIG. 4b.

In the preferred embodiment, a linear array of conformal grating devices is formed by arranging the devices as illustrated in FIGS. 1–3 with the direction of the grating period $\Lambda$ (the y direction) perpendicular to the array direction (the x direction). The diffracted orders are then at various angles in the y-z plane and are perpendicular to the array direction. Even with a large linear array consisting, possibly, of several thousand devices illuminated by a narrow line of light, the diffracted orders become spatially separated over a relatively short distance. This feature simplifies the optical system design and enables feasible designs in which the separation of orders can be done spatially without the need of Schlieren optics.

In a linear array made from conventional GLV devices, the grating period is parallel to the array directions which leads to a much larger distance needed for spatial separation of the diffracted orders. As a comparative example, let us consider an array of conformal grating devices that is 4 cm long (2000 devices 20 $\mu$m wide) illuminated by a 100 $\mu$m line of light. For devices with a period chosen such that the diffracted orders are angularly separated by 1 degree, the orders will become spatially separated in approximately 6 mm. A similar 4 cm linear array of prior art GLV devices with a 4 degree angular separation between diffracted orders would require at least 60 cm for spatial separation, without the use of a Schlieren optical system.

Furthermore, because the grating period $\Lambda$ in a conformal grating array is perpendicular to the array direction, the array can be made many periods wide, with no significant constraint on the number of periods possible. Increasing the number of periods improves the optical alignment tolerances and provides some built-in redundancy in case of local device failure. If a portion of a conformal grating device stops functioning, the optical beam can be repositioned to a working portion.

To understand the electromechanical and optical operation of the conformal grating device in more detail, it is helpful to examine the expected performance of a realistic design with the following materials and parameters:

Substrate material: silicon

Bottom conductive layer: doped silicon

Protective layer: silicon dioxide, thickness=50 nm

Spacer layer: silicon dioxide, thickness=150 nm

Ribbon layer: silicon nitride, thickness=100 nm, tensile stress =600 Mpa

Reflective and conductive layer: aluminum, thickness=50 nm

Grating period $\Lambda$=20 $\mu$m

Suspended length of elongated ribbon element=16 $\mu$m

Width of elongated ribbon element w=30 $\mu$m

Width of intermediate supports=4 $\mu$m

This type of design allows for fabrication with CMOS methods and integration with CMOS circuitry. The resonant frequency of the ribbon elements in this particular design is approximately 11 MHz. Most practical designs have resonant frequencies between 2 MHz and 15 MHz. Because of this high resonance, the switching time of the device can be very short.

Figure 5:
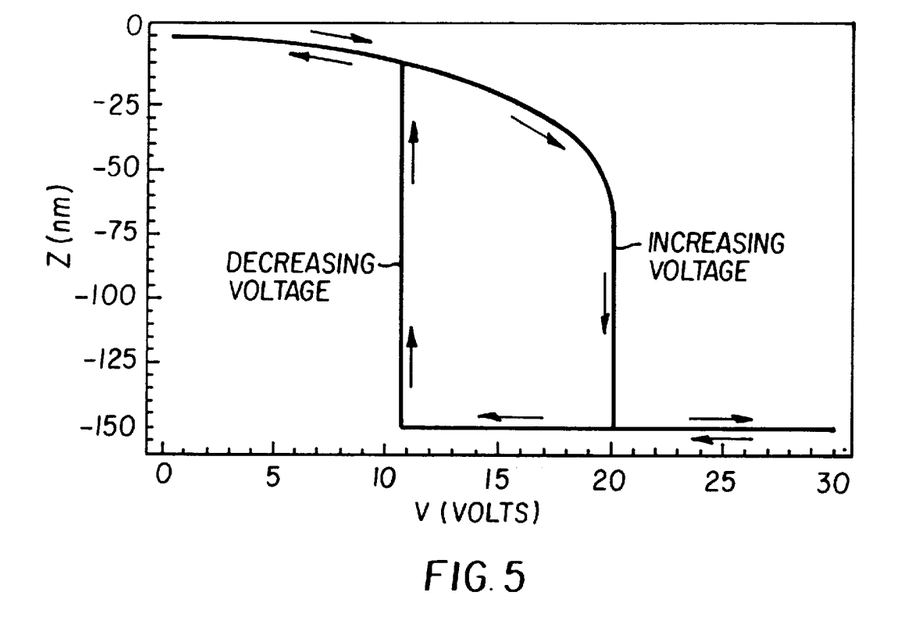
FIG. 5 is a plot showing device position as a function of applied voltage.
Figure 6:
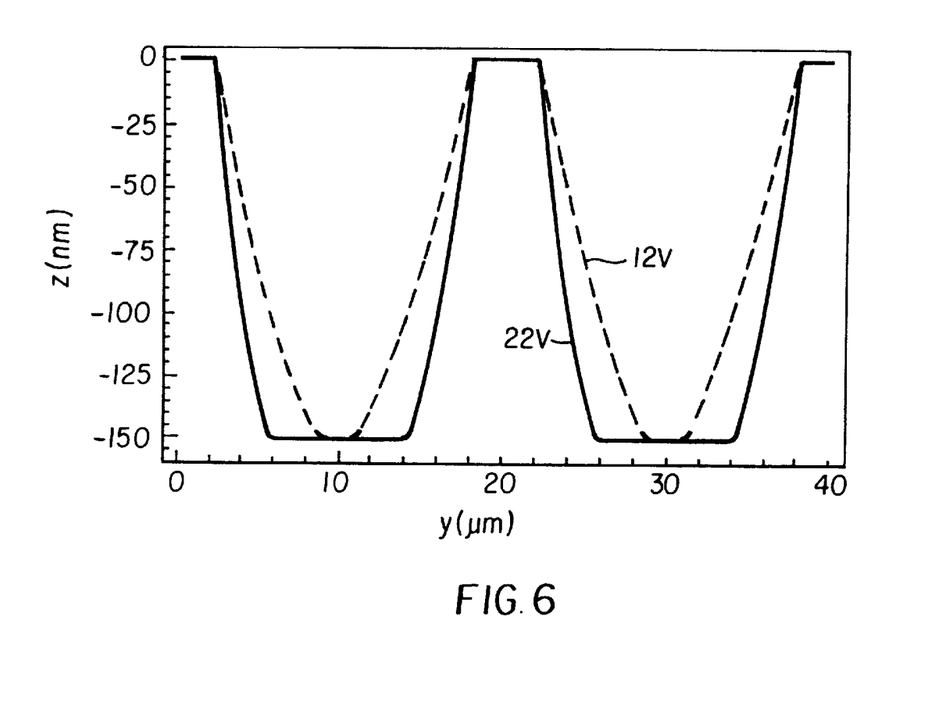
FIG. 6 is a diagram showing the deflected element profile in response to two different acutation voltages in device.

FIGS. 5 and 6 show the modeled electromechanical operation of this particular device. FIG. 5 is a plot of the position of the elongated ribbon element at the center of a channel as a function of applied voltage, illustrating the associated hysteresis. As the voltage is increased from 0 V, the center displacement increases in approximately a quadratic manner until the pull-down voltage of 20.1 V is reached. At this voltage, the electrostatic force overcomes the tensile restoring force and the ribbon slams into the substrate. Further increasing the applied voltage changes the shape of the deformed ribbon, but cannot change the center position. With the ribbon in contact with the substrate, the voltage can be reduced below the pull-down value while maintaining contact, until release at 10.8 V. This hysteresis can be exploited to improve the optical performance of the device. It can also be used as a switch in certain applications.

FIG. 6 demonstrates how the grating profile may be modified by adjusting the applied voltage. The profile of two periods of the actuated device is shown at 12V (dotted line) and at 22V (solid line), with the ribbon and substrate in contact. To obtain this 12V profile, contact must first be established by applying a value larger than the pull-down voltage of 20.1 V. Because 12V is only slightly larger that the release voltage, only a small portion of the ribbon touches the substrate. This change in shape with voltage has an important impact on the diffraction efficiency of the device.

Figure 7:
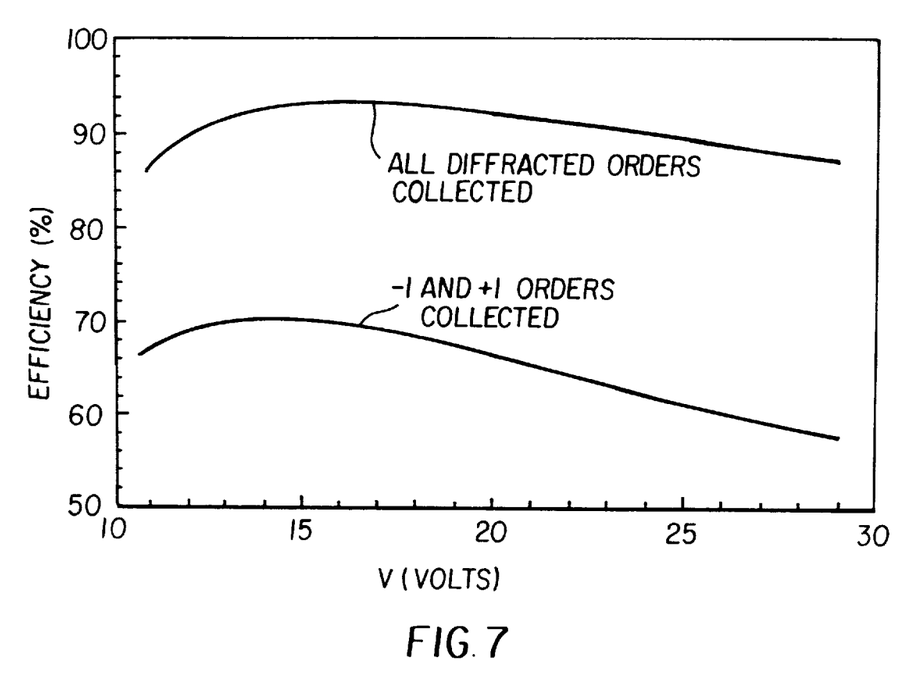
FIG. 7 is a plot showing diffraction efficiency of the modulator as a function of applied voltage for two different optical system.

FIG. 7 is a plot of the diffraction efficiency of the device as a function of applied voltage, assuming an illumination wavelength of 550 nm and 100% reflectivity. Efficiency curves are shown for two cases: 1) an optical system that collects of the −1 and +1 diffracted orders and 2) a system that collects all of the diffracted orders. The curves for both cases show that the voltage can be adjusted to maximize the diffraction efficiency. For the first system the maximum occurs at about 14.5 V, whereas for the second it occurs at about 16V. In order to achieve the optimal optical performance with this particular design, it is necessary to first establish contact by applying a voltage larger than the pull-down voltage of 20.1 V. The voltage is then reduced to obtain the optimal shape.

Figure 8:
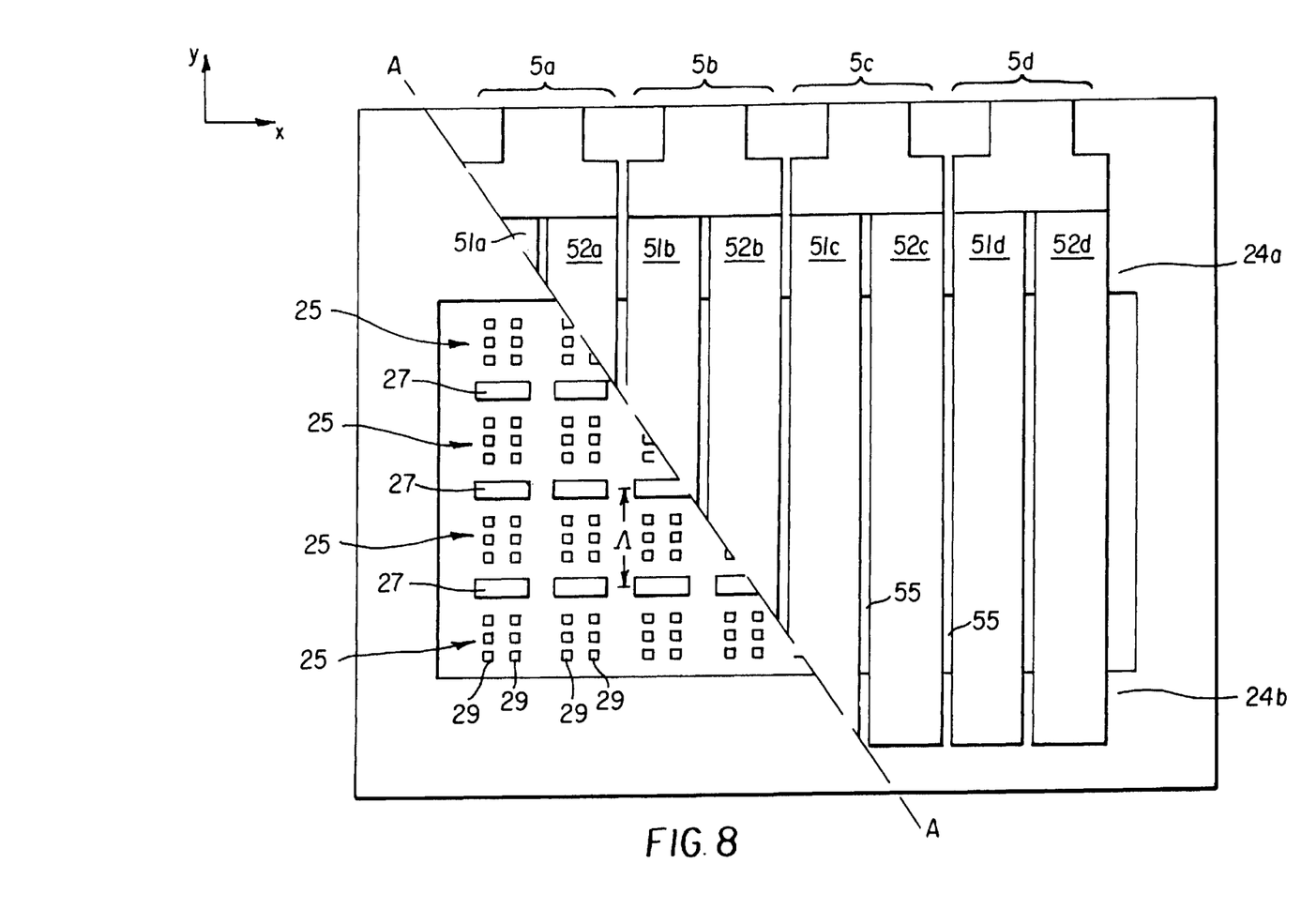
FIG. 8 is a top view of an alternate embodiment of the spatial light modulator.

An alternate embodiment of conformal grating devices is shown in FIG. 8, which depicts a top view of a four-device lineal array similar to FIG. 2. Each of the conformal grating devices 5a, 5b, 5c and 5d now has an associated pair of elongated ribbon elements (51a, 52a), (51b, 52b), (51c, 52c) and (51d, 52d), respectively. This subdivision of each device permits fabrication of wider devices without significantly impacting optical performance. The preferred method of fabrication is to etch a sacrificial layer from the channel, thus releasing the ribbon elements. The gaps 55 between the elements allow the etchant to access this sacrificial layer. Increasing the number of gaps 55 can therefore improve the etching process. In practice, it may be necessary to further subdivide the conformal grating devices into more than two. The elongated ribbon elements are depicted partially removed over the portion of the diagram below the line 2—2 in order to show the underlying structure. For best optical performance and maximum contrast, the intermediate supports 27 must be completely hidden below the elongated ribbon elements 51a, 52a, 5b, 52b, 51c, 52c, 51d and 52d. Therefore, when viewed from the top, the intermediate supports 27 must not penetrate into the gaps 55. The ribbon elements within a single conformal grating device are mechanically isolated, but electrically coupled. They therefore operate in unison when a voltage is applied.

Figure 9A:
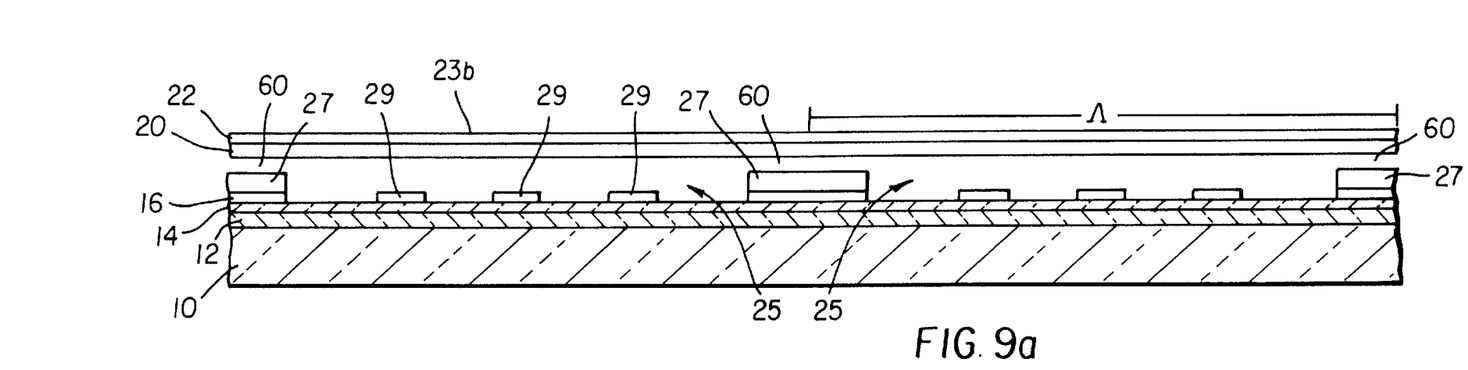
FIG. 9a and b are cross sectional views of a further alternative embodiment of the spatial light modulator according to the present invention.
Figure 9B:
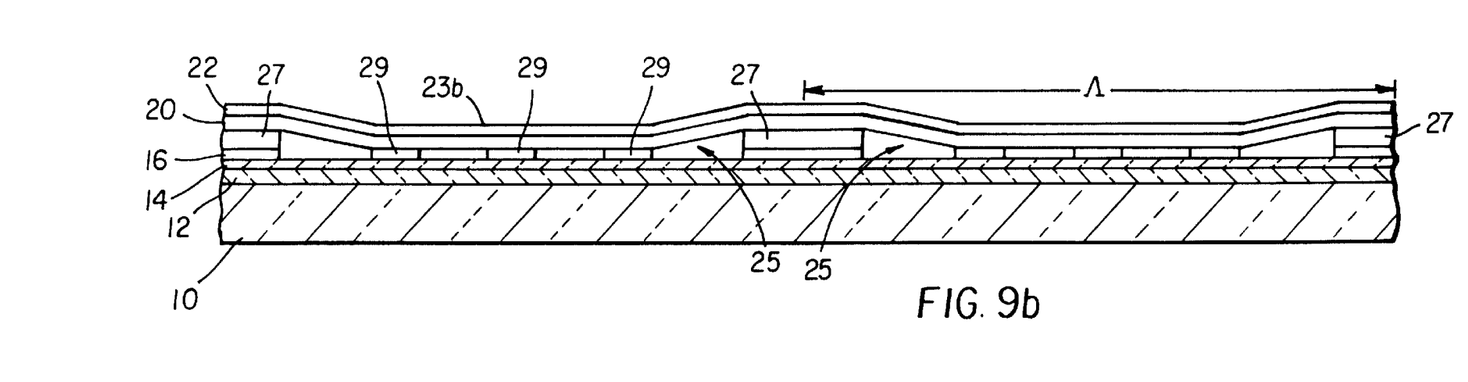

The conformal grating devices described in the above embodiments have intermediate supports attached to the elongated ribbon elements. To obtain very high contrast, these supports must be completely hidden when the devices are not actuated and the ribbon elements must be completely flat. However, in practice, the fabrication causes some nonuniformity in the profile of the ribbon element just above the intermediate supports. The nonuniformity produces a weak grating reducing the contrast of the device. FIGS. 9a and 9b show an alternate embodiment that reduces this problem. The side view is the same as in FIGS. 3a and 3b. FIG. 9a depicts the two channels 25 between the three intermediate supports 27 of the device in the unactuated state. FIG. 9b shows the same view of the actuated state. In the unactuated state, with no voltage applied to the device, the ribbon element 23b is suspended flat above the intermediate supports 27 by the two end supports 24a and 24b (see FIG. 2), leaving a small gap 60 between the top of the intermediate supports 27 and the bottom of the ribbon element 23b. When a voltage is applied to actuate the device, the bottom of the ribbon element 23b makes contact with the top of the intermediate supports and a partially conforming grating is created. FIGS. 3b shows the device in the fully actuated state with the elongated ribbon element 23b also touching the standoffs 29.

The invention has been described in detail with particular reference to certain preferred embodiments thereof, but it will be understood that variations and modifications can be effected within the spirit and scope of the invention.

5a conformal grating device
5b conformal grating device
5c conformal grating device
5d conformal grating device
10 substrate
12 bottom conductive layer
14 protective layer
16 standoff layer
18 spacer layer
20 ribbon layer
22 reflective and conductive layer
23a elongated ribbon element
23b elongated ribbon element
23c elongated ribbon element
23d elongated ribbon element
24a end supports
24b end supports
25 channel
27 intermediate supports
29 standoffs
30 light beam
32 gaps
33 reflected light beam
35a +$1^{st}$ order beam
35b −$1^{st}$ order beam
36a +$2^{nd}$ order beam
36b −$2^{nd}$ order beam
51a elongated ribbon elements
52a elongated ribbon elements
51b elongated ribbon elements
52b elongated ribbon elements
51c elongated ribbon elements
52c elongated ribbon elements
51d elongated ribbon elements
52d elongated ribbon elements
55 gaps
60 small gap

What is claimed:

1. A mechanical conformal grating device for modulating an incident beam of light by diffraction, comprising:
   a) an elongated element including a light reflective surface;
   b) a pair of end supports for supporting the elongated element at both ends over a substrate;
   c) at least one intermediate support between the end supports; and
   d) means for applying a force to the elongated element to cause the element to deform between first and second operating states, wherein the elongated element partially conforms mechanically to the intermediate support in the second operating state to form an optical grating with a diffraction grating period determined by placement of the intermediate support.

2. The mechanical conformal grating device claimed in claim 1, wherein in the first operating state, the elongated element functions as a plane reflector and in the second operating state the elongated element functions as an optical grating with the diffraction grating period parallel to the length of the elongated element.

3. The mechanical conformal grating device claimed in claim 1, wherein the intermediate support contacts the elongated element only when in the second operating state.

4. The mechanical conformal grating device claimed in claim 1, wherein the elongated element is supported under tension.

5. The mechanical conformal grating device claimed in claim 1, further including a standoff located on the substrate under the elongated element to prevent the elongated element from sticking to the substrate when the elongated element is deformed.

6. The mechanical conformal grating device claimed in claim 1, wherein the force is an electrostatic force.

7. The mechanical conformal grating device claimed in claim 6, wherein the elongated element includes a first conductor, and the substrate under the elongated element includes a second conductor for applying a voltage to generate the electrostatic force.

8. A method of operating the mechanical conformal grating device claimed in claim 7, wherein the mechanical conformal grating device exhibits hysteresis, comprising the steps of:
   a) applying a voltage across the conductors of the device to switch the device from the first state to the second state; and
   b) decreasing the voltage to hold the elongated element in a more optimal second state.

9. The mechanical conformal grating device claimed in claim 1, wherein the elongated element comprises a plurality of parallel spaced apart portions.

10. The mechanical conformal grating device claimed in claim 1, wherein the intermediate support is not visible when viewing the light reflective surface of the elongated element.

11. A mechanical conformal grating device array for spatially modulating an incident beam of light by diffraction, comprising a plurality of mechanical conformal grating devices, each grating device comprising:
   a) an elongated element including a light reflective surface;
   b) a pair of end supports for supporting the elongated element at both ends over a substrate;
   c) at least one intermediate support between the end supports; and
   d) means for applying a force to the elongated element to cause the element to deform between first and second operating states, wherein the elongated element partially conforms mechanically to the intermediate support in the second operating state to form an optical grating with a diffraction grating period determined by placement of the intermediate support.

12. The mechanical conformal grating device array claimed in claim 11, wherein in the first operating state, the elongated elements functions as a plane reflector and in the second operating state the elongated element functions as optical grating with the diffraction grating period parallel to the length of the elongated element.

13. The mechanical conformal grating device array claimed in claim 11, wherein the intermediate support contacts the elongated element only when in the second operating state.

14. The mechanical conformal grating device array claimed in claim 11, wherein the elongated element is supported under tension.

15. The mechanical conformal grating device array claimed in claim 11, further including a standoff located on the substrate under the elongated element to prevent the elongated element from sticking to the substrate when the elongated element is deformed.

16. The mechanical conformal grating device array claimed in claim 11, wherein the force is an electrostatic force.

17. The mechanical conformal grating device array claimed in claim 16, wherein the elongated element includes a first conductor, and the substrate under the elongated element includes a second conductor for applying a voltage to generate the electrostatic force.

18. The mechanical conformal grating device array claimed in claim 11, wherein the elongated element comprises a plurality of parallel spaced apart portions.

19. The mechanical conformal grating device array claimed in claim 11, wherein the intermediate supports are not visible when viewing the light reflective surfaces of the elongated elements.

20. The mechanical conformal grating device array claimed in claim 11, wherein the grating devices are arranged in a line such that light is diffracted in a direction perpendicular to the line.

21. The mechanical conformal grating device array claimed in claim 11, wherein the grating devices are arranged in a two dimensional array.

22. A mechanical conformal grating device for modulating an incident beam of light by diffraction, comprising:

a) an elongated element including a light reflective surface;

b) a pair of end supports for supporting the elongated element at both ends over a substrate;

c) at least one intermediate support between the end supports, wherein the elongated element is secured to the intermediate support and the end supports; and d) means for applying a force to the elongated element to cause the element to deform between first and second operating states, wherein the elongated element partially conforms mechanically to the intermediate support in the second operating state to form an optical grating with a diffraction grating period determined by placement of the intermediate support.

23. The mechanical conformal grating device claimed in claim 22, wherein in the first operating state the elongated element functions as a plane reflector and in the second operating state the elongated element functions as an optical grating with the diffraction grating period parallel to the length of the elongated element.

24. The mechanical conformal grating device claimed in claim 22, wherein in the first operating state the elongated element is suspended flat and in the second operating state the elongated element has a smoothly varying profile with at least two periods.

25. The mechanical conformal grating device claimed in claim 22, wherein the elongated element is supported under tension.

26. The mechanical conformal grating device claimed in claim 22, further including a standoff located on the substrate under the elongated element to prevent the elongated element from sticking to the substrate when the elongated element is deformed.

27. The mechanical conformal grating device claimed in claim 22, wherein the force is an electrostatic force.

28. The mechanical conformal grating device claimed in claim 27, wherein the elongated element includes a first conductor, and the substrate under the elongated element includes a second conductor for applying a voltage to generate the electrostatic force.

29. The mechanical conformal grating device claimed in claim 22, wherein the elongated element comprises a plurality of parallel spaced apart portions.

30. The mechanical conformal grating device claimed in claim 22 wherein the intermediate support is not visible when viewing the light reflective surface of the elongated element.

* * * * *

UNITED STATES PATENT AND TRADEMARK OFFICE
CERTIFICATE OF CORRECTION

PATENT NO.   : 6,307,663 B1
DATED        : October 23, 2001
INVENTOR(S)  : Marek W. Kowarz et al.

It is certified that error appears in the above-identified patent and that said Letters Patent is hereby corrected as shown below:

Title page should be deleted to be replace with the attached title page.

Drawings,
Figure 1: Part Identifying Number 25 is missing the arrow in two locations (see attached).
Figure 2: Section Line 3-3 has been renamed 3,9-3,9 (see attached).
Figure 3b: delete "$[0_{-1}]$ and $[0_{+1}]$" and insert -- $\theta_{-1}$ -- and -- $\theta_{+1}$ -- respectively (see attached).

Column 1,
Line 16, after "data storage" and before "and" insert a comma.
Line 29, delete "U.S Pat." and insert -- U.S. Pat. --.

Column 3,
Line 26, after "plastic" insert a comma.
Line 31, after "silicon" insert a comma.
Line 32, after "protective layer 14" insert -- , a standoff layer 16, --.
Line 47, after "speed" insert a comma.
Line 59, after "end supports" insert -- 24a and 24b --.
Line 60, delete "and b" and insert -- and 24b --.
Line 63, delete "layer 14" and insert -- layer 16 --.
Line 64, after "elements" insert -- 23a and 23b --.
Line 65, after "standoffs" insert -- 29 --.

Column 4,
Line 2, after "the line" delete "2-2" and insert -- A-A --.
Line 7, after "supports" insert -- 27 --.
Line 24, delete "conducting layer" and insert -- reflective and conductive --.
Line 32, delete "FIGS." and insert -- Fig. --.

Column 6,
Line 44, after "the line" delete "2-2" and insert -- A-A --.

UNITED STATES PATENT AND TRADEMARK OFFICE
CERTIFICATE OF CORRECTION

PATENT NO.    : 6,307,663 B1
DATED         : October 23, 2001
INVENTOR(S)   : Marek W. Kowarz et al.

It is certified that error appears in the above-identified patent and that said Letters Patent is hereby corrected as shown below:

<u>Column 7,</u>
Line 8, after "supports" insert -- 27 --.
Line 9, delete "FIGS. 3b" and insert -- Fig. 9b --.
Line 22, at part identifying number 14, before "protective" insert -- dielectric --.

Signed and Sealed this

Twentieth Day of May, 2003

JAMES E. ROGAN
*Director of the United States Patent and Trademark Office*

(12) United States Patent
Kowarz (10) Patent No.: US 6,307,663 B1
(45) Date of Patent: Oct. 23, 2001

(54) SPATIAL LIGHT MODULATOR WITH CONFORMAL GRATING DEVICE

(75) Inventor: Marek W. Kowarz, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/491,354

(22) Filed: Jan. 26, 2000

(51) Int. Cl.[7] ............................. G02B 26/00; G02B 5/18
(52) U.S. Cl. ..................... 359/231; 359/291; 359/295; 359/572; 359/573; 359/900
(58) Field of Search ........................... 359/572, 573, 359/291, 292, 295, 290, 223, 224, 225, 900

(56) References Cited

U.S. PATENT DOCUMENTS

| | | |
|---|---|---|
| 4,441,791 | 4/1984 | Hornbeck . |
| 4,626,920 | 12/1986 | Glenn . |
| 4,857,978 | 8/1989 | Goldburt et al. |
| 5,170,283 | 12/1992 | O'Brien et al. ............... 359/291 |
| 5,311,360 | 5/1994 | Bloom et al. ............... 359/572 |
| 5,459,610 | 10/1995 | Bloom et al. ............... 359/572 |
| 5,661,592 | 8/1997 | Bornstein et al. ............ 359/291 |
| 5,677,783 | 10/1997 | Bloom et al. ............... 359/224 |
| 5,841,579 | 11/1998 | Bloom et al. ............... 359/572 |
| 5,844,711 | 12/1998 | Long, Jr. .................... 359/291 |
| 5,867,302 | * 2/1999 | Fleming ..................... 359/291 |
| 5,982,553 | 11/1999 | Bloom et al. ............... 359/627 |
| 6,215,579 | * 4/2001 | Bloom et al. ............... 359/572 |

OTHER PUBLICATIONS

H. Roder et al., "Full–colour diffraction–based optical system for light-valve projection displays", *Displays 16*, 1995, pp. 27–34.

W. Brinker et al., "Metallized viscoelastic control layers for light-value projection displays," *Displays 16*, 1995, pp. 13–20.

* cited by examiner

Primary Examiner—Cassandra Spyrou
Assistant Examiner—John Juba, Jr.
(74) Attorney, Agent, or Firm—Thomas H. Close; Stephen H. Shaw (57) ABSTRACT

A mechanical grating device for modulating an incident beam of light by diffraction includes an elongated element including a light reflective surface; a pair of end supports for supporting the elongated element at both ends over a substrate; at least one intermediate support between the end supports; and means for applying a force to the elongated element to cause the element to deform between first and second operating states

30 Claims, 8 Drawing Sheets

FIG. 1

FIG. 2